3,443,962
METHOD OF FREEZE-DRYING COFFEE
Byron Everett Elerath, Mountain Lakes, N.J., assignor to General Foods Corporation, White Plains, N.Y., a corporation of Delaware
No Drawing. Filed Jan. 29, 1965, Ser. No. 429,156
Int. Cl. A23f 1/08; F26b 5/06
U.S. Cl. 99—71                                      1 Claim

ABSTRACT OF THE DISCLOSURE

The rate of vacuum freeze-drying frozen slabs of coffee, or other solids-containing liquids, is appreciably increased by scraping or disrupting the surface of said frozen slabs prior to freeze-drying the slabs.

---

This invention relates to a method for improving the rate for freeze-drying of aqueous liquids containing solids and, more particularly, to a method for improving the rate for freeze-drying coffee.

In the art of vacuum freeze-drying roasted coffee extract it has been necessary to take as long as 15–25 hours in order to dry the frozen coffee to a stable moisture content. This is true even at low condenser temperatures of −60° F. and low pressures of about 50–500 microns of mercury. The long time required for freeze drying has been a problem both in the case of large bodies (frozen layers or slabs) of coffee extract as well as granulated or subdivided frozen extract.

When freezing a large body of coffee extract in the form of a frozen slab, sheet, or thick layer, the coffee extract appears to form an impervious surface film during freezing. This film serves to impede the rate of freeze-drying by acting as a barrier to the removal of water vapors from the interior portions of the frozen extract. Thus, it has been found that the drying time in the case of frozen coffee slabs is directly proportional to the thicknesses of the slabs instead of being proportional to the theoretical thickness squared. The decrease in the drying rate from the theoretical is believed to be due to the impeding surface film. Hence, while the heat transfer throughout the body of frozen extract during drying is good and presents no serious problem, removal of sublimed vapors is impeded by this frozen film or coating on the surface of the frozen material. In the case where the frozen coffee extract is subdivided or granulated subsequent to freezing, this impeding surface film is removed or destroyed and the vapor removal problem is eliminated but another problem is presented. The frozen extract, when subdivided and arranged in granulated beds, presents a heat transfer problem due to the presence of voids between each particle. These voids in the bed of frozen extract hinder the transfer of heat from particle to particle and, therefore, decrease the rate of sublimation. Also, as the particles become smaller, dried particles tend to become entrained in escaping water vapors due to fluidization of the bed during drying and are lost.

It would, therefore, be desirable if a simple method were devised for increasing the rate of vapor removal when freeze-drying coffee extract and other aqueous liquids which contain solids without decreasing the heat transfer rate of the frozen coffee.

It has now been discovered that the rate for removing water vapors from a body of frozen coffee extract during vacuum freeze-drying may be increased without decreasing the heat transfer rate of said frozen coffee by cooling said extract to below its eutectic point to freeze all the water in said extract, said frozen extract thereby having a surface film which impedes the rate of water vapor removal during sublimation; disrupting this film to thereby expose the frozen extract; subliming the frozen water in said coffee into water vapors, and removing a major part of said vapors through the disrupted portions of film.

"Disrupting," as used in this specification, means removing, abrading, cutting, scratching, perforating, breaking, cracking or otherwise disturbing part of the surface film of a body of frozen coffee extract in order to provide a more direct and open path for the removal of water vapors by vacuum sublimation from the interior portions of the frozen coffee.

"Eutectic point", as used in this specification, refers to the lowest possible melting point of roasted coffee extract. The eutectic point for coffee extract is usually −10° F. to −13.5° F. and the eutectic mixture consists of a mixture of water, coffee aromatics, and coffee solids (soluble and insoluble).

"Freeze-drying," as used herein, means the vacuum removal of water from the solid to the vapor state without passing through an intermediate liquid state. In the case of coffee, this drying occurs at a vacuum of below 500 microns of mercury.

While the advantages of this invention are realized whenever any body of liquid coffee extract or other solids containing aqueous liquid is frozen and then freeze-dried, the invention is more specifically directed to freezing a thin or thick layer of solids containing liquid in the form of a slab or sheet which has two large surface areas available for heat transfer and vapor removal. In removing the surface film of this slab, it is only necessary to remove or disturb the film on one of the slab surfaces in order to achieve improved results. Typically, all of the film on the surface through which water vapor will pass during freeze-drying should be disrupted. However, portions of the surface film can be left undisturbed. This undisturbed area should not exceed one-half of the length through which the sublimed water vapors must travel to escape the frozen product. Thus, where only one surface of a ½" slab is scraped and used for vapor removal the path of vapor removal can be considered to be ½" and ¼" is the maximum dimension that can be left uninterrupted. For a ½" thick slab or sheet wherein both slab surfaces are scraped for vapor removal purposes, the length of travel for water vapor removal is ¼" and the maximum width or dimension of uninterrupted area on the surface film should never exceed ⅛". If this is exceeded, there is danger of melting the product during sublimation.

The surface film, once disrupted by perforation, abrasion, cutting, etc. need not be removed or separated from the surface. Thus, in the case of disrupting the upper surface of a frozen slab adapted to be dried in a freeze-dryer having horizontal shelves, it is not necessary to remove the loosened portions of disrupted film from the slab prior to drying. However, once the surface which is to be used for water vapor removal during freeze-drying has been chosen, this surface should be sufficiently disrupted to allow a free and unrestricted path for the removal of water vapors.

Formation of this deleterious surface film is not a function of the freezing method, such film occurring whether the aqueous liquid substance is fast frozen (several seconds) or slowly frozen (over a period of several minutes to several hours). Also, the film forms whether the sheet or slab of aqueous liquid is frozen in a vertical or horizontal manner.

It is undertood that this improved manner of freeze-drying can be applied to any other solids-containing aqueous liquid which can be dried from an aqueous form to recover soluble solids. This invention can apply to drying all aqueous extracts, juices, suspensions, solutions and emulsions which form an impervious surface barrier or film which restricts the removal of water vapors. Whether this film is formed or not can be easily determined by whether the particular aqueous liquid dries at a rate which is directly proportional to its slab thickness or at a rate which is proportional to the slab thickness squared. If the former rate governs the drying time, then a film barrier is formed and the teachings of this invention can be used to remove this barrier.

This invention will now be specifically described in regard to coffee.

Example

A small laboratory freeze dryer having a drying chamber of 15" x 24" x 24" was used with an external condenser maintained at −40° F. to −60° F. Slabs of roasted coffee extract having 26% soluble solids were cast in a mold using −30° F. brine. The slab dimensions were ½" x 6" x 6". Slabs of extract were placed on an open mesh screen made of expanded aluminum. Heat was supplied from oil heated platens above and below the product at a distance of ¾". The screen was arranged on an internal scale so that weight of product could be measured as drying proceeded. Thermocouples were placed in the center of slab so that temperature could be recorded. Pressure was reduced to less than 300 microns of mercury and heat applied at such a degree that the ice layer approached but did not exceed −10° F.

In the first sample, an unscraped coffee slab was dried and it was found that 120° F. platen temperature initially resulted in a −11° F. product ice temperature. Small modifications in the platen temperature were made as drying progressed to keep the frozen coffee at about −10° F. to −12° F. When the ice layer had disappeared, the platen temperature was reduced to 110° F. and maintained at this temperature until no further weight loss was noted. The weight of water removed was plotted against time of drying so that percent of total water times original thickness in sixteenths of an inch was called the thickness dried. It was found that until the ice layer disappeared that drying time was controlled by the formula $$T = 1.3L$$

where T was the drying time in hours and L the thickness in sixteenth inches. The overall drying time was 17.5 hours and this corresponds to $T = 2.2L$.

In the second sample, the same technique was used except that the top surface of the slab was completely scratched to a depth of about 1/32 inch with a cooled hacksaw blade. The loosened material remained on the surface and became frozen to it. In this case, platen temperatures of about 350° F. were inadequate to provide enough heat and the ice temperature remained at −12° F. to −14° F. It was found that the rate of drying was controlled by the formula $$T = 0.9L^2$$

until disappearance of the ice layer occurred. Overall drying time for this slab was 9.6 hours and this corresponded to $T = 0.15L^2$.

While this invention has been described by reference to a specific example directed to coffee, it is understood that the broad teachings of this invention can be applied to other liquid materials which form an impeding surface film during freezing, this film serving to restrict vapor removal during subsequent freeze-drying of the frozen material.

What is claimed is:

1. A process for increasing the rate for removing sublimed water vapor from frozen coffee extract without decreasing the heat transfer rate of said coffee which comprises applying a layer of said extract on a freezing surface, said layer having two large surfaces available for subsequent water vapor removal; cooling said layer of coffee extract to below its eutectic point in order to freeze all the water present in said extract and thereby form a film on said two surfaces of frozen extract which restricts the removal of water vapors; disrupting portions of said film on at least one of the large surface areas available for drying in order to separate said film and thereby expose the frozen extract beneath said film, said film being disrupted to a degree wherein the maximum dimension of non-disrupted film on said surface is less than ½ the length through which water vapor must travel to escape from the frozen slab of coffee extract; subliming frozen water in said coffee extract into water vapor; and removing a major part of said vapor through said disruptive film.

References Cited

UNITED STATES PATENTS

| 2,292,447 | 8/1942 | Irwin | 99—199 |
| 3,253,420 | 5/1966 | De George | 99—71 X |

OTHER REFERENCES

Cotson S., et al., "Freeze-Drying of Foodstuffs," Columbine Press, Manchester, England, 1963, p. 81, in Gr. 170.

MAURICE W. GREENSTEIN, Primary Examiner.

U.S. Cl. X.R.

34—5; 99—199, 206